Patented Apr. 11, 1944

2,346,322

UNITED STATES PATENT OFFICE 2,346,322

CHALK - RESISTANT TITANIUM DIOXIDE PIGMENT AND METHOD FOR PREPARING THE SAME

Walter K. Nelson, Metuchen, N. J., assignor to National Lead Company, New York, N. Y., a corporation of New Jersey No Drawing. Application May 2, 1941, Serial No. 391,545

10 Claims. (Cl. 106—300)

The present invention relates to titanium dioxide pigments and has especial reference to titanium dioxide pigments possessing superior chalk-resistant properties.

The chalking property of a pigment may be defined as the tendency of the film-forming component of a pigmented protective or decorative coating to undergo decomposition at the exposed surface leaving a powdery layer of the pigment behind. Upon continued weathering the powdery layer wears away and disintegration of the film-forming material continues until eventually the coating is destroyed. Titanium dioxide pigments, particularly pigmentary titanium dioxide, are known to possess, to a rather considerable degree, a tendency to promote chalking when incorporated in film-forming vehicles.

Various methods have been suggested for retarding the chalking tendency of titanium dioxide pigments. Among such suggested methods have been the coating of the particles of titanium dioxide pigments with a variety of different materials, such as alumina, and the like, as well as the calcination of hydrous titanium dioxide in addition with certain agents, such as antimony oxide. Products produced by these prior art methods, while exhibiting some improvement, were not possessed of sufficient chalk resistance to justify their ready acceptance and wide use industrially as substantially non-chalking pigments intended for use in exterior finishes.

It is the principal object of the present invention to prepare titanium dioxide pigments having superior chalk-resistant properties without appreciable detriment to other pigment properties. This and other objects of the invention will become apparent from this description.

According to the invention particles of a previously prepared titanium dioxide pigment are intimately associated with small amounts of chromium oxide or silicate and with a white silicate of another metal and with alumina. The resulting pigment, after drying and pulverizing, exhibits remarkable chalk resistance.

To obtain the maximum improvement in chalk resistance, it is preferable to associate the pigment particles with the alumina after the treatment with the chromium compound and metal silicate, but the invention is not to be limited to any particular sequence. As will be explained, the pigment particles may first be treated with the metal silicate and thereafter with the chromium compound and alumina. Alternatively, the treatment with the chromium compound may precede the silicate treatment. Furthermore, the chromium and metal silicate treatment may be carried out together in such fashion that the pigment becomes associated with the silicates of chromium and another metal prior to the treatment with alumina.

The chromium treatment may be effected by suspending the pigment particles in a solution of a soluble chromium salt, e. g., chromium chloride, chromium sulfate, and the like, and adding thereto a precipitating agent, e. g., caustic soda, potash, ammonia or other alkaline reacting reagents. The amount of chromium which is thus deposited on the pigment particles presumably as hydrate should be about 0.05 percent but may vary between about 0.03 percent and about 0.07 percent, calculated as chromium, Cr, based on the weight of the pigment treated. The amount of chromium may be controlled by regulating the concentration of the chromium salt solution, and/or the amount and concentration of the precipitant.

The treatment with white metal silicate may be carried out by suspending the pigment particles in a solution of a soluble silicate, for instance, an alkali metal silicate and adding thereto a salt of a metal, the silicate of which is white and insoluble. Alternatively, the pigment may be suspended in the solution of the metal salt which forms the insoluble white silicate and adding thereto the soluble silicate. The first mentioned method is to be preferred because the soluble silicates, particularly the alkali metal silicates are dispersing agents for titanium dioxide pigments and hence assist in the suspension of the pigment. Among the white insoluble silicates which may be thus incorporated with the pigment are silicates of metals of group II, e. g., those of barium, calcium or magnesium, group III, e. g., those of aluminum, thallium and group IV, e. g., those of zirconium, titanium, tin, etc. For the optimum results, the silicate of zirconium is preferred. The amount of silicate to be precipitated upon the pigment particles should be about 2.0 percent of the weight of the pigment to be treated but may vary between about 1.0 percent and about 3.0 percent. The amount of silicate can be controlled by regulating the concentrations of soluble silicate and metal salt solution, and/or the amount of soluble silicate or metal salt solution whichever is used as the agent for precipitating the insoluble silicates. The invention also contemplates the incorporation of freshly and separately precipitated white insoluble metal silicate with previously prepared titanium dioxide pigment.

As has been stated the chromium and metal silicate treatment may be carried out in a single step. For instance, the pigment particles may be suspended in a solution of salts of chromium and, for example, zirconium to which may be added an alkali metal silicate. According to this procedure, the chromium as well as the zirconium, or other metal the silicate of which is white and insoluble, will be precipitated as silicates. Furthermore, if desired the mixed silicates may be freshly and separately prepared and then admixed with the pigment particles.

The alumina may be associated with the pigment particles in any suitable manner. It is, however, preferable to suspend the particles of pigment in a solution of a salt of aluminum and to add thereto a precipitating agent, e. g., an alkali-reacting reagent such as ammonia, sodium hydroxide, etc. Aluminum hydrate is thus precipitated upon the pigment particles. After the precipitation, the treated particles are separated from the supernatant mother liquor. The amount of aluminum hydrate which gives the optimum results is about 1 percent, calculated as $Al_2O_3$, based on the weight of the pigment treated but may vary between about 0.75 percent and about 1.25 percent. The amount of aluminum hydrate to be precipitated on the pigment particles may be controlled by regulating the concentration of the aluminum salt solution and/or the amount of precipitating agent added to the suspension of pigment particles in the salt solution. The invention also contemplates the incorporation of freshly and separately prepared aluminum hydrate with previously prepared titanium dioxide pigments.

It has been found, according to the invention, that a final heat-treatment of the pigment particles at a temperature of from about 40° C.–80° C. while still in suspension in the mother liquor for a few hours helps to insure the attainment of optimum results. Generally speaking, the various treatments should be so carried that after each treatment the pigment slurry should exhibit a neutral or slightly alkaline pH while at the end the slurry should be slightly alkaline.

The invention is applicable to the treatment of all known titanium dioxide pigments, including pigmentary titanium dioxide pigments, composite titanium dioxide pigments, titanate pigments, and the like. When hydrous titanium dioxide is calcined in admixture with a small amount in the order of about 1.0 percent of antimony oxide or a compound of antimony which on calcination yields antimony oxide, the resulting calcined antimony-containing pigment after treatment with alumina, chromium and silicate according to the invention shows even greater resistance to chalking as compared with a similarly treated titanium dioxide pigment but containing no antimony.

The following examples will illustrate the invention:

Example 1

5,000 grams of a calcined pure titanium dioxide pigment were mixed with water to form a slurry containing about 18% solids. To this slurry was added about 163 grams of a chromium chloride solution ($CrCl_3.6H_2O$) containing 2.5 grams of chromium (Cr) equivalent to 0.05% Cr based on the weight of dry $TiO_2$. This mixture was agitated for 1½ hours at room temperature and thereafter about 27½ cc. of a 10% sodium hydroxide solution was added. By this treatment the pH value of the slurry was adjusted to about 7.0–7.2 and hydrated chromium oxide was precipitated on the pigment particles.

To the pigment particles treated as above with hydrated chromium oxide, in the same reaction vessel, 788 cc. of a zirconyl sulfate solution containing 65 grams of $ZrO_2$ and equivalent to 1.3% $ZrO_2$, on the basis of dry pigment, were then added to the pigment slurry, and the mixture agitated for 1½ hours, after which about 1440 cc. of a 10% solution of sodium metasilicate were added. By this treatment hydrated zirconium silicate was precipitated on the pigment particles at a pH of 7.0–7.2.

After the zirconium silicate treatment, in the same reaction vessel, 1650 cc. of aluminum sulfate solution were added. The aluminum sulfate solution contained about 50 grams $Al_2O_3$ and was equivalent to about 1% $Al_2O_3$ on the $TiO_2$ basis. The mixture was agitated for an additional 1½ hours after which a sufficient amount of 10% sodium hydroxide solution was added to raise the pH value to about 7.0–7.2 and thereby to precipitate aluminum hydrate upon the pigment particles.

The pigment thus treated with chromium oxide, zirconium silicate, and alumina and suspended in the mother liquor, was heated to about 50–60° C. and maintained within this temperature range for about two hours while finally adjusting the pH value to about 7.3–7.5. The pigment was then filtered and washed in the usual manner until substantially free from soluble salts, dried and pulverized.

Example 2

In this example the pigment was treated with hydrated chromium oxide and hydrated zirconium silicate in the manner described under Example 1.

1250 grams of hydrated aluminum oxide slurry containing 50 grams $Al_2O_3$ were prepared by reaction between a 10% solution of sodium hydroxide and a solution of aluminum sulfate. The freshly precipitated aluminum hydrate was washed and intimately mixed with the chromium oxide and zirconium silicate treated particles by stirring for about 1½ hours after which the mixture was heated to a temperature between 50° C. and 60° C., the pH was adjusted to about pH=7.3–7.5 and the heating continued for about 2 hours. Thereafter the pigment was finished as described under Example 1.

Example 3

In this example the pigment was treated with hydrated chromium oxide as described under Example 1.

Zirconium silicate was prepared by adding a sufficient amount of a solution of sodium metasilicate to 980 cc. of a zirconyl sulfate solution containing 80 grams $ZrO_2$ to produce a final pH of about 7. The freshly precipitated zirconium silicate while still suspended in the mother liquor was added to the chromium treated pigment slurry and the mixture agitated for 1 hour. After the incorporation of the zirconium silicate the alumina treatment and the finishing operations were conducted as described under Example 1.

Example 4

A slurry of titanium dioxide pigment similar to that used in Example 1 was mixed with 163 grams of a chromium chloride solution as described under Example 1. To this mixture was then added 780 cc. of a zirconyl sulfate solution similar to that employed in Example 1 and the whole stirred for 1½ hours. To this mixture was then added a sufficient amount of a 10% solution of sodium metasilicate to produce a pH value of about 7.0–7.2 thereby precipitating both chromium and zirconium silicates upon the suspended pigment particles.

The alumina treatment and the finishing operations were conducted as described under Example 1. A second series of 4 preparations similar in every respect to those described under Examples 1–4 were prepared but in these preparations the titanium dioxide pigment contained about 1% of antimony, calculated as $Sb_2O_3$ which had been incorporated with the hydrous titanium oxide and cocalcined therewith.

*Example 5*

This example was carried out in every respect as described under Example 1, but the pigment employed was a composite barium sulfate-titanium dioxide pigment containing about 30% $TiO_2$ and 70% $BaSO_4$.

The base pigment, i. e., the pure titanium dioxide, which was used in the first four above examples had a tinting strength as determined by the well-known Reynolds' method (reference) of about 1225 and a color as rated on a color scale where 0–00 represents nearly perfect whiteness of 0 and when evaluated for chalk resistance showed considerable chalking after about six weeks' exposure to atmospheric conditions. The products obtained from Examples 1 to 4, inclusive, showed tinting strengths of about 1250 and a color very slightly worse than 0. When evaluated for chalk resistance these pigments showed about three-fold enhanced resistance; that is to say, whereas the base pigment rated considerable chalking after six weeks' exposure, the products of Examples 1–4 rated the same degree of chalking only after about 17 weeks' exposure. Although the base pigment used in Examples 5–8 which contained antimony was somewhat more chalk resistant than was the base pigment (tinting strength=1225; color=0–00) used for Examples 1–4, having a rating of 8 weeks before showing considerable chalking, similar improvement in chalk resistance without detriment to pigment properties was obtained. Thus, the products of Examples 5–8 had tinting strengths of about 1250, color about 0, and a chalk resistance rating of about 28 weeks.

The improved chalk resistance of the present effect is not the cumulative effect of the individual effects of the chromium, metal silicate, and alumina. It is rather in the nature of a "booster" effect in which the optimum chalk resistance obtainable from each treatment without detriment to other pigment properties is attained and this chalk resistance is "boosted" higher by the subsequent treatments. For instance, it has been found that, according to the invention, as much as 3.05 percent of agents which impart chalk resistance may be incorporated without material impairment of brightness, whiteness or tinting strength whereas, if this amount of either alumina, chromium, or silicate alone were used the brightness, color and tinting strength would be so reduced as to render the pigment unfit for sale. Thus, the invention embraces the treatment of titanium dioxide pigments with the optimum amount of chromium compound capable of producing maximum chalk resistance without detriment to other pigment properties, the treatment with the optimum amount of white insoluble metal silicate capable of further raising the chalk resistance without detriment to pigment properties, and the subsequent treatment with the optimum amount of alumina capable of even further raising the chalk resistance and still without detriment to pigment properties. This surprising conjoint effect appears to be resident in the unique combination of the chromium-silicate-alumina treatment.

I claim:

1. A chalk resistant titanium dioxide pigment comprising particles of a titanium dioxide pigment intimately associated with a chromium compound resulting from the reaction of a water-soluble chromium salt and an alkaline-reacting precipitating agent, a white water-insoluble metal silicate, and alumina, the amount of said chromium compound being between about 0.03 percent and about 0.07 percent, calculated as chromium, Cr, the amount of the white metal silicate being between about 1.0 percent and about 3.0 percent and the amount of aluminum hydrate, calculated as $Al_2O_3$, being between about 0.75 percent and about 1.25 percent, based upon the weight of pigment particles.

2. A chalk resistant titanium dioxide pigment comprising particles of a titanium dioxide pigment intimately associated with the reaction products formed by adding alkali-reacting precipitating agents to solutions of water-soluble chromium salts, by adding a water-soluble silicate to solutions of water-soluble salts of metals yielding white water-insoluble silicates and by adding alkali-reacting precipitating agents to solutions of water-soluble aluminum salts, the amount of said chromium compound being between about 0.03 percent and about 0.07 percent, calculated as chromium, Cr, the amount of the white metal silicate being between about 1.0 percent and about 3.0 percent and the amount of aluminum hydrate, calculated as $Al_2O_3$, being between about 0.75 percent and about 1.25 percent, based upon the weight of pigment particles.

3. A chalk resistant titanium dioxide pigment comprising particles of a titanium dioxide pigment intimately associated with between about 0.03 percent and about 0.07 percent chromium hydrate, calculated as chromium, Cr, between about 1.0 percent and 3.0 percent of a white water-insoluble metal silicate and between about 0.75 percent and about 1.25 percent aluminum hydrate, calculated as $Al_2O_3$, based on the weight of pigment particles.

4. A chalk resistant titanium dioxide pigment comprising particles of a titanium dioxide pigment intimately associated with between about 0.03 percent and about 0.07 percent of chromium silicate, calculated as chromium, Cr, between about 1.0 percent and about 3.0 percent of a white water-insoluble metal silicate and between about 0.75 percent and 1.25 percent aluminum hydrate, calculated as $Al_2O_3$, based on the weight of pigment particles.

5. A chalk resistant titanium dioxide pigment comprising particles of a titanium dioxide pigment intimately associated with about 0.5 percent chromium hydrate, calculated as chromium, Cr, about 2.0 percent zirconium silicate, and about 1.0 percent aluminum hydrate, calculated as $Al_2O_3$, based on the weight of pigment particles.

6. Process for the preparation of chalk resistant titanium dioxide pigments which comprises suspending particles of a titanium dioxide pigment in a solution of a water-soluble chromium salt adding thereto an alkali-reacting precipitating agent, suspending the so-treated pigment particles in a solution of a salt of metal yielding a white water-insoluble silicate and adding thereto a water-soluble silicate, suspending the so-treated pigment in a solution of a water-soluble aluminum salt and adding thereto an alkali-reacting precipitating agent, the amounts and concentrations of the reactants being so controlled that the amount of the precipitated chromium compound, calculated as Cr, will be between about 0.03 percent and about 0.07 percent, the amount of precipitated white metal silicate will be between about 1.0 percent and 3.0 percent, and the amount of precipitated aluminum hydrate, calculated as $Al_2O_3$, will be between about 0.75 percent and 1.25 percent, based on the weight of pigment particles, separating, and washing and drying the so-treated pigment particles.

7. Process for the preparation of chalk resistant titanium dioxide pigments which comprises forming, in situ, in aqueous medium in which is suspended particles of a titanium dioxide pigment: (a) chromium hydrate by reaction between a soluble chromium salt and an alkali-reacting precipitating agent; (b) a white metal silicate by reaction between a salt of a metal yielding a white water-insoluble silicate and a water-soluble silicate; (c) aluminum hydrate by reaction between a soluble aluminum salt and an alkali-reacting precipitating agent, the amounts and concentrations of the reactants being so controlled that the amount of the precipitated chromium compound, calculated as Cr, will be between about 0.03 percent and about 0.07 percent, the amount of precipitated white metal silicate will be between about 1.0 percent and 3.0 percent, and the amount of precipitated aluminum hydrate, calculated as $Al_2O_3$, will be between about 0.75 percent and 1.25 percent, based on the weight of pigment particles, separating, and washing and drying the so-treated pigment particles.

8. Process for the preparation of chalk resistant titanium dioxide pigments which comprises intimately associating in moist condition particles of a titanium dioxide pigment with freshly precipitated chromium hydrate, freshly precipitated white, water-insoluble metal silicate and freshly precipitated aluminum hydrate, the amount of the chromium hydrate, calculated as chromium, Cr, being between about 0.03 percent and about 0.07 percent; the amount of the white metal silicate being between about 1.0 percent and about 3.0 percent and the amount of aluminum hydrate, calculated as $Al_2O_3$, being between about 0.75 percent and about 1.25 percent, based upon the weight of pigment particles.

9. Process for the preparation of chalk resistant titanium dioxide pigments which comprises suspending particles of a titanium dioxide pigment in a solution of a water-soluble chromium salt and adding thereto an alkali-reacting precipitating agent, suspending the so-treated pigment particles in a solution of a water-soluble zirconium salt and adding thereto a water-soluble silicate, suspending the so-treated pigment particles in a solution of a water-soluble aluminum salt and adding thereto an alkali-reacting precipitating agent, the amounts and concentrations of the reactants being so controlled that the amount of the precipitated chromium compound, calculated as Cr, will be between about 0.03 percent and about 0.07 percent, the amount of precipitated white metal silicate will be between about 1.0 percent and 3.0 percent, and the amount of precipitated aluminum hydrate, calculated as $Al_2O_3$, will be between about 0.75 percent and 1.25 percent, based on the weight of pigment particles, separating, and washing and drying the so-treated pigment particles.

10. A chalk resistant titanium dioxide pigment comprising particles of a titanium dioxide pigment intimately associated with about 0.5 percent of chromium hydrate, calculated as chromium, Cr, about 2.0 percent titanium silicate, and about 1.0 percent aluminum hydrate, calculated as $Al_2O_3$, based on the weight of the pigment particles.

WALTER K. NELSON.